United States Patent [19]

Watanabe et al.

[11] 4,420,223
[45] Dec. 13, 1983

[54] OPTICAL APPARATUS HAVING A MIRROR

[75] Inventors: Yoshio Watanabe; Nobuo Iijima, both of Yokohama, Japan

[73] Assignee: Fujitsu Limited, Kawasaki, Japan

[21] Appl. No.: 325,383

[22] Filed: Nov. 27, 1981

[30] Foreign Application Priority Data

Nov. 28, 1980 [JP] Japan ................................. 55-167511

[51] Int. Cl.³ .............................................. G02B 5/08
[52] U.S. Cl. ........................................ 350/310; 356/357; 356/358
[58] Field of Search ...................... 350/288, 299, 310; 430/942; 356/352, 357, 358

[56] References Cited

U.S. PATENT DOCUMENTS

| | | | |
|---|---|---|---|
| 3,622,244 | 11/1971 | Chitayat | 356/358 X |
| 3,671,130 | 6/1972 | Bowker | 356/358 |
| 3,796,494 | 3/1974 | Takabayashi | 356/358 |
| 3,832,040 | 8/1974 | Ciabrini | 350/310 |

FOREIGN PATENT DOCUMENTS 962835 2/1975 Canada ............................... 356/357

OTHER PUBLICATIONS

Mallwitz, D. "An Inteferometer to Check the Truth of 90° Angles," *Feinwerktechnik & Messtechnik*, vol. 85, No. 4 (May–Jun. 1977) pp. 163–165.

*Primary Examiner*—John K. Corbin
*Assistant Examiner*—Richard Gallivan
*Attorney, Agent, or Firm*—Staas & Halsey

[57] ABSTRACT

An optical apparatus wherein a mirror is mounted on a stage. On such stage a supporting portion is provided and the mirror is fixed such to supporting portion at a single portion of the mirror. At the free end portions of the mirror, which are not fixed to the stage, the end surface is in contact with a buffering member.

15 Claims, 9 Drawing Figures

OPTICAL APPARATUS HAVING A MIRROR

BACKGROUND OF THE INVENTION

1. Field of the Invention

The present invention relates to an optical apparatus having a mirror.

2. Description of the Prior Art

For example, in the electron beam exposure system, a wafer is mounted on a stage which can move in both the vertical and horizontal directions in a plane for the irradiation of the desired regions by the electron beam.

In regard to this stage, it is essential to detect the position of stage with high accuracy in order to irradiate the electron beam accurately on the wafers. A laser interferometer is often used for accurately detecting the position of the stage.

The laser interferometer uses a laser generator, half mirror, etc. Thereby, the location of the stage can be detected by counting the interference fringes generated by the laser beam radiated from the laser generator and the laser beam which is radiated from the laser generator and then reflected at the stage. For the purpose of detecting the accurate location of the stage using such a laser interferometer, the stage is provided with a mirror which reflects the laser beam. The usual method of mounting this mirror to the stage will be explained below. FIG. 1a and FIG. 1b show the existing mirror mounting methods.

On a stage 1, consisting of the light weight metal such as aluminium alloy or magnesium alloy, the wafer 4 on which the electron beam is irradiated is mounted and a couple of mirrors 2a, 2b arranged in directions orthogonally crossing, in the case of FIG. 1a, are fixed on the stage 1 by the end portions 3a, 3b, 3c, 3d of the mirrors being screwed or by the bonding method using a bonding agent. On the other hand, an L-shaped mirror 2C can be used (FIG. 1b). This mirror is also fixed in the same way as in FIG. 1a at the end portions of the L-shaped mirror at 3e, 3g, and at the corner portion thereof 3f.

Stage 1 is usually composed of material such as aluminium alloy, as explained above, and the mirror, on the other hand, is composed of material such as quartz glass.

When comparing the linear expansion coefficients of the mirror and the stage, a large difference can be found because the quartz glass shows a value of $7 \times 10^{-7}/°$ C., while the aluminium shows a value of $23.9 \times 10^{-6}/°$ C.

If the temperature changes while the wafer is irradiated by the electron beam, the points of the mirror attached to the stage follow the expansion and contraction of the stage, resulting in deformation of the mirror as indicated by the broken line of FIGS. 1a and 1b. Thereby, the crossing angle of mirrors in the vertical and horizontal directions which should naturally be crossing orthogonally is deviated from the desired 90 degrees. When the electron beam is irradiated on the wafer and the pattern is formed, the pattern formed is deformed in the vertical and horizontal directions because the positioning of the electron beam is carried out with reference to the laser beam reflecting surface of this mirror.

Thus, it may be possible to employ such a structure that only the corner portion 3f of the L-shaped mirror is fixed and the end portions 3e and 3g are free, for example in the case of FIG. 1b, in order to prevent distortion of the mirror. However, fixing the mirror only at a single point would permit the free end portions of the L-shaped mirror to vibrate around such fixing point. As a result, accurate measurement is impossible.

SUMMARY OF THE INVENTION

It is an object of the present invention to provide an optical apparatus which provides a mirror having a linear expansion coefficient different from that of a stage on which it is mounted and which does not allow deformation of the mirror even if a temperature change occurs.

It is another object of the present invention to provide an optical apparatus which substantially does not allow a change of angle between a couple of perpendicular mirror surfaces even if a temperature change occurs.

It is a further object of the present invention to provide an optical apparatus having simplified structure.

According to the present invention these objects can be realized, in an optical apparatus having a mirror on a stage, by providing:

a supporting portion provided on the stage, a mirror which is fixed at a single portion to the supporting portion and which has a free end portion not fixed to the stage, and a buffering member which is in contact with the end surface of the free end portion of the mirror.

DESCRIPTION OF THE PREFERRED EMBODIMENTS

Figure 1A:
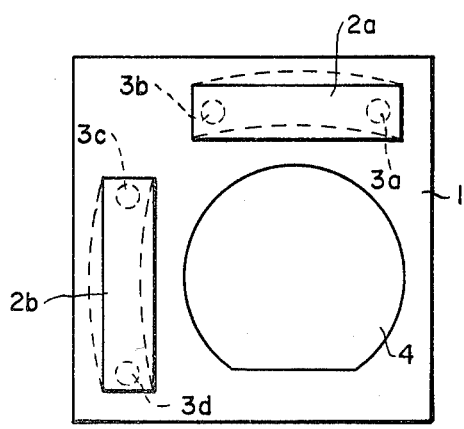
FIGS. 1a, 1b respectively show the existing type stages used for an electron beam exposing system.
Figure 2A:
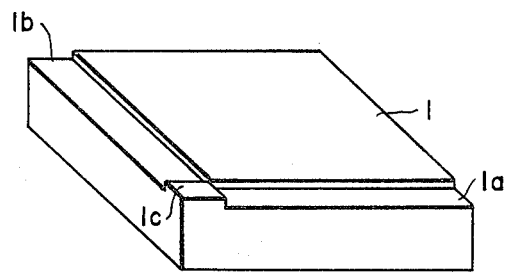
FIGS. 2a, 2b, 2c explain the improved structure of an optical apparatus according to the present invention.
Figure 2B:
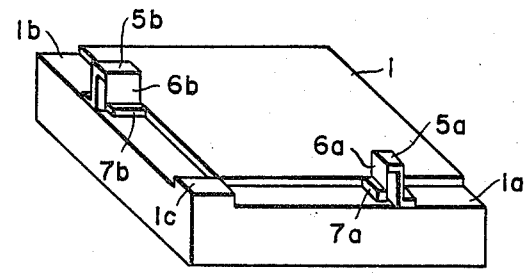
Figure 2C:
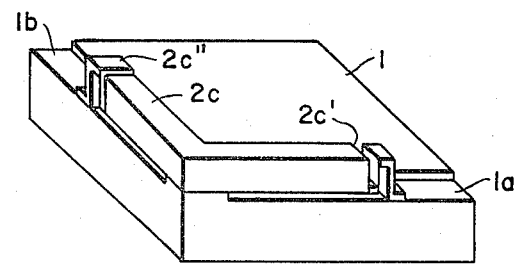

FIGS. 2a, 2b, 2c are perspective views for explaining an embodiment of the present invention.

As will be clearly understood from the structure of the optical apparatus according to the present invention, these figures indicate the assembling processes in the sequence of FIGS. 2a, 2b, 2c. FIG. 2C shows the completed optical apparatus according to the present invention.

As shown in FIG. 2a, the step portions 1a, and 1b are provided along two sides crossing orthogonally at the upper surface of 1 which preferably is made of aluminium. In addition, at the intersecting point of such two sides, the supporting portion 1C is formed.

On such step portions 1a and 1b of stage 1, the mounting parts 5a and 5b are fixed by a screwing or by a bonding agent as shown in FIG. 2b.

Moreover, at the upper front part of the mounting parts 5a and 5b, the flat plates 6a and 6b are attached. These flat plates 6a and 6b each function as a plate spring, namely as a buffering member.

At the lower front part of the flat plates 6a and 6b, rectangular parallelopiped spacers 7a and 7b are provided. Moreover, as shown in FIG. 2C, L-shaped mirror 2C is fixed on the supporting portion 1C at the corner part of the L by a screwing or bonding agent, while a end surfaces 2C' and 2" are fixed to the spacers 7a and 7b by a bonding agent. It is most desirable that the end surfaces 2C' and 2C" and the spacers 7a and 7b be mechanically connected in this way, but is is also permitted that both are only in contact with each other through an extremely large friction resistance. The mounting parts 5a and 5b, flat plates 6a and 6b, and spacers 7a and 7b, are all preferably made of phosphor bronze.

Figure 3:
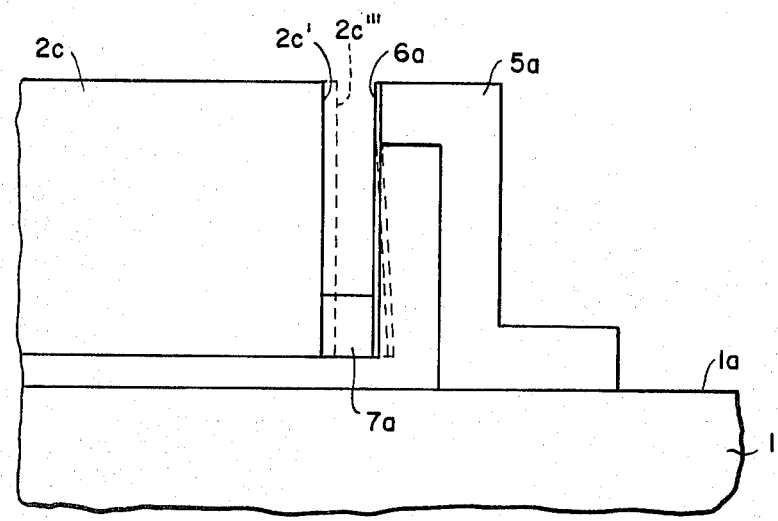
FIG. 3 is an enlarged view of a part of the optical apparatus shown in FIG. 2C.

FIG. 3 shows in enlarged form the part near the end surface 2C' of the mirror 2C in the optical apparatus of FIG. 2C.

As explained above, the end surface 2C' of the mirror 2C is bonded to the spacer 7a which is attached to the flat plate 6a, which in turn is attached to the mounting member 5a. Therefore, when the relative position of the end surface 2C' of mirror 2C shifts to the position 2C''' (indicated in FIG. 3 by the broken line) with respect to the stage 1 due to a temperature change, the flat plate 6a works as a plate spring and is bent as indicated by the broken line.

Thereby, the stress working on the mirror 2C when the end portion of the mirror is fixed by a bonding agent, etc., is alleviated by means of the flat plate 6a, resulting in no deformation of the mirror. Therefore, the crossing angle formed by the crossing of the two sides of L-shaped mirrors is kept at 90 degrees with an extremely small error.

The inventors of the present invention conducted the following experiments in order to confirm the effect of the present invention.

The stage mounting the L-shaped mirror was accommodated in a thermal chamber and autocollimators were respectively provided for each of the two sides of the mirror crossing orthogonally for measuring the location of the two sides. In addition, a temperature sensor was also provided on the stage in order to measure the temperature on the stage.

(a) The stage according to the present invention as shown in FIG. 2C was heated and its temperature was raised up to 24.3° C. from 20.6° C. and then lowered to 20.6° C. In this case, the deviated angle from 90° C. between the orthogonally crossing two sides of the L-shaped mirrors is indicated in FIG. 4a.

Figure 4A:
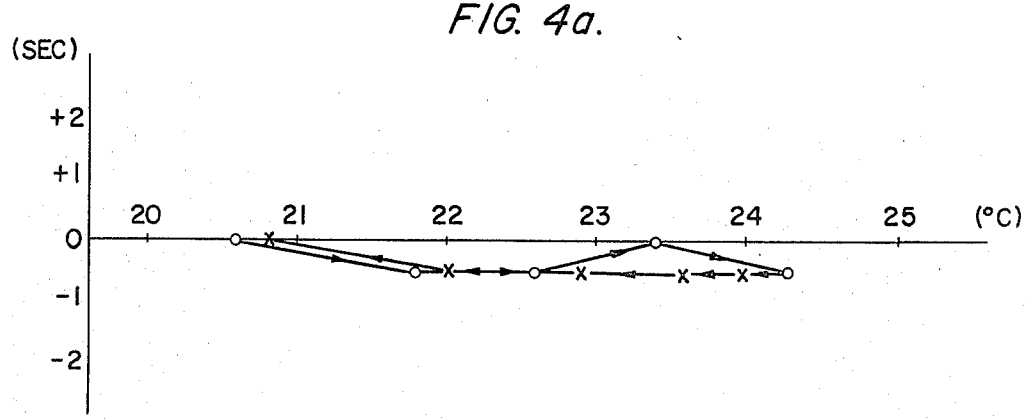
FIG. 4a shows the relation between temperature and angular deviation of the optical apparatus according to the present invention.

In FIG. 4a, angular deviation (in seconds) is plotted on the vertical axis, while the temperature (°C.) is plotted on the horizontal axis.

As is obvious from FIG. 4a, the maximum angular deviation of in the stage of the present invention was −0.5" (seconds).

Figure 1B:
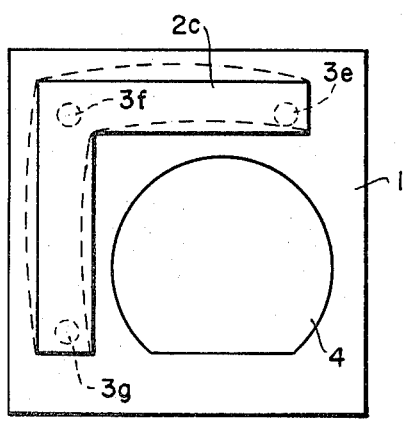

(b) The stage temperature was lowered to 20.8° C. from 24.3° C. and then raised, with the stage fixing the mirrors at the three points accommodated within the thermal chamber as shown in FIG. 1b.

Figure 4B:
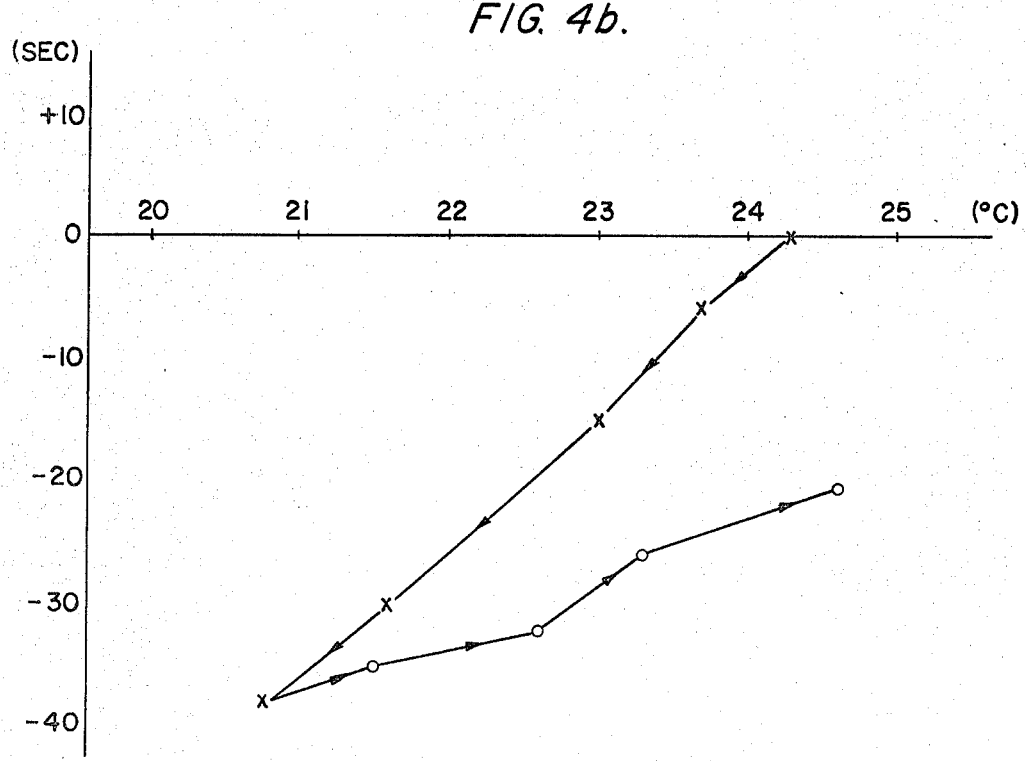
FIG. 4b shows the relation between temperature and angular deviation of the existing type optical apparatus.

In this case, variation of deviation from 90° of the crossing angle is indicated in FIG. 4b.

The angular deviation is plotted on the vertical axis (seconds) of FIG. 4b, while the temperature is plotted on the horizontal axis.

As is obvious from FIG. 4b, the maximum deviation of the existing stage was −38" (seconds). In FIG. 4a, 4b, the angular deviation while the temperature is raised is plotted with the mark o, while that when the temperature is lowered is plotted with the mark x.

The results of this experiment show that distortion of mirrors in the stage of the present invention is extremely small in comparison with that of the existing stage, and deviation of the crossing angle of the two sides of the L-shaped mirrors from 90 degrees is also extremely small.

Moreover, the optical apparatus according to the present invention can be structured with simple elements such as the mounting member, flat plate and spacer, etc. and the apparatus itself can be realized with parts which do not require high accuracy.

Figure 5:
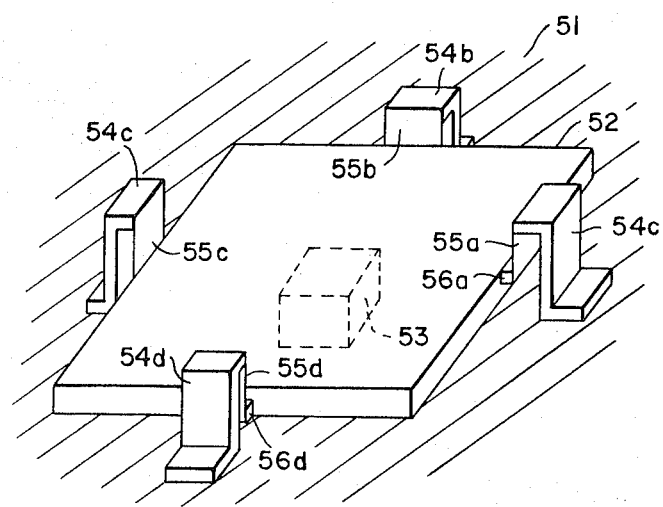
FIG. 5 shows a 2nd embodiment of the present invention.

The second embodiment of the present invention is illustrated in FIG. 5. This optical apparatus provides a flat mirror 52 on a metal stage 51. When the mirror 52 is fixed on the stage 51 with all the bottom surface being in contact with the stage, "bending" of the mirror, which is required to have accurate flatness, occurs due to the temperature change because the mirror has a different expansion coefficient from that of the stage.

Therefore, as shown in FIG. 5, the supporting plate 53 is provided on the stage in accordance with the present invention and the mirror 52 is fixed thereon by a bonding method. In addition, as in the case of the first embodiment, the mounting plates 54a to 54d providing the flat plates 55a to 55d are installed at the four positions on the sides of the mirror 52 on the stage 51.

The spacers 56a to 56d are bonded at the sides of the mirror.

In the optical apparatus according to the present invention, if the expansion coefficients of the mirror and the stage mounting it differ largely, deviation of size due to the difference of expansion coefficients is absorbed by the flat plates 55a to 55d, which operate as the buffering member.

As a result, such a stress large enough for effecting deformation of the mirror is not applied thereto, and thus the flatness of the mirror can be maintained.

We claim:

1. An optical apparatus for a stage comprising;
   a supporting portion provided on said stage,
   a mirror which is fixed at a single portion thereof to said supporting portion and having a free end portion not fixed to said stage, and
   a buffering member in contact with an end surface of said free end portion of said mirror.

2. An optical apparatus as claimed in claim 1, wherein said buffering member comprises a mounting member fixed to said stage and a plate spring attached to said mounting member.

3. An optical apparatus as claimed in claim 2, wherein said buffering member further comprises a spacer provided on said plate spring, said spacer being in contact with said end surface of said mirror.

4. An optical apparatus as claimed in claim 1, wherein said buffering member is mechanically connected to the end surface of said mirror.

5. An optical apparatus as claimed in claim 1, wherein said mirror is L-shaped.

6. An optical apparatus as claimed in claim 5, wherein said mirror is fixed to said supporting portion at the corner part of the L-shape mirror.

7. An optical apparatus as claimed in claim 5, further comprising an additional buffering member, the end surfaces of both end portions of the L-shaped mirror being in contact with a buffering member.

8. An optical apparatus as claimed in claim 1, wherein said mirror is flat shaped.

9. An optical apparatus as claimed in claim 8, wherein said flat mirror is fixed to said supporting portion at the center of the mirror.

10. An optical apparatus for an electron beam exposure system comprising:
   a movable stage;
   a supporting portion provided on said stage;
   a mirror fixed at a portion thereof to said supporting portion, said mirror additionally having a free portion not fixed to said stage; and
   buffering means in contact with said free portion of said mirror for avoiding mirror deformation when a temperature change takes place by allowing expansion of the mirror without deformation while still restraining the free portion of said mirror from free vibration.

11. An optical apparatus as claimed in claim 10, wherein said buffering means includes a mounting member fixed to said stage and a plate spring having a first end attached to said mounting member and having a second end operatively connected to said free portion of said mirror.

12. An optical apparatus as claimed in claim 11, wherein said buffering means further includes a spacer attached to the second end of said spring plate, said spacer being in contact with said free portion of said mirror.

13. An optical apparatus as claimed in claim 12, wherein said mirror is L-shaped and has a corner portion and two divergent free portions, said mirror being fixed to said supporting portion at the corner portion of the L-shape.

14. An optical apparatus as claimed in claim 13, further comprising an additional buffering means, each of the two divergent portions of the L-shaped mirror being in contact with one of said buffering means.

15. An optical apparatus as claimed in claim 10, wherein said mirror is flat and rectangular in shape, and is fixed to said supporting portion at the center of the mirror thus leaving the perimeter thereof unfixed to the stage.

* * * * *

UNITED STATES PATENT AND TRADEMARK OFFICE
CERTIFICATE OF CORRECTION

PATENT NO. : 4,420,223

DATED : Dec. 13, 1983

INVENTOR(S) : Watanabe et al.

It is certified that error appears in the above-identified patent and that said Letters Patent is hereby corrected as shown below:

Front page, [57] Abstract, line 3, "such to" should be --to such--.
Column 1, line 9, "in the" should be --in a--;
Column 1, line 14, after "of" insert --the--;
Column 1, line 30, "the" should be --a--;
Column 1, line 36, after "screwed" insert --thereto,--;
Column 1, line 41, after "thereof" insert --at--.
Column 3, line 4, "2" should be --2C--.
Column 4, line 62, "L-shape" should be --L-shaped--.

Signed and Sealed this

Twentieth Day of November 1984

[SEAL]

Attest:

GERALD J. MOSSINGHOFF

Attesting Officer        Commissioner of Patents and Trademarks